United States Patent [19]

Nozaki

[11] 3,887,595

[45] June 3, 1975

[54] CARBONYLATION PROCESS
[75] Inventor: Kenzie Nozaki, St. Louis, Mo.
[73] Assignee: Shell Oil Company, Houston, Tex.
[22] Filed: Mar. 5, 1973
[21] Appl. No.: 338,112

[52] U.S. Cl. ............ 260/410.6; 260/398; 260/410; 260/410.5; 260/410.9 R; 260/413; 260/468 M; 260/471 R; 260/476 R; 260/485 R; 260/497 A; 260/514 M; 260/515 R; 260/533 A; 260/546
[51] Int. Cl. ...................... C07c 51/14; C07c 67/00
[58] Field of Search .. 260/410.9 R, 497 B, 533 AN, 260/546, 410.6

[56] References Cited
UNITED STATES PATENTS

| 3,668,249 | 6/1972 | Fenton | 260/546 |
| 3,780,074 | 12/1973 | Romanelli | 260/410.9 R |
| 3,793,369 | 2/1974 | Hara et al. | 260/497 A |

OTHER PUBLICATIONS

Bittler et al., Angew. Chem. Internat. Edit., Vol. 7, No. 5, pp. 329–35, (1968).
Conti, Chemical Abstracts, Vol. 79, 118699, u, (1973).

Primary Examiner—Donald G. Daus
Assistant Examiner—Diana G. Rivers

[57] ABSTRACT

An improved catalyst composition for carbonylating olefinically unsaturated hydrocarbons with carbon monoxide and a hydroxylic compound comprises a zero-valent palladium or platinum complex incorporating stabilizing phosphine ligands, and excess ligand. Use of these catalyst compositions results in a high ratio of straight-chain to branch-chain product when employed in the carbonylation of alpha olefins to produce carboxylic acids, esters or acid anhydrides.

8 Claims, No Drawings

CARBONYLATION PROCESS

BACKGROUND OF THE INVENTION

1. Field of the Invention

The present invention relates to an improved process for the carbonylation of olefinically unsaturated compounds to produce carboxylic acids and derivatives of such carboxylic acids such as esters and acid anhydrides. Such carboxylic acids and acid derivatives are useful in the preparation of plasticizers, solvents and detergents.

2. Description of the Prior Art

It is known that carboxylic acids and carboxylic acid derivatives are obtained by reaction of olefins with carbon monoxide and a hydroxylic compound at elevated temperature and pressure in the presence of certain metal-containing catalysts. The catalysts are generally salts of Groups VIII metals of the periodic table, which metals are capable of forming metal carbonyls. It is also known to employ metal carbonyls. See, for example, W. Reppe, Liebigs *Ann. Chem.*, 583, 1 (1953).

One such metal carbonyl catalyst system employs cobalt carbonyl complexed with pyridine. The cobalt-containing catalyst systems, however, suffer from several disadvantages. For instance, small quantities of halogens or diolefins will poison such catalysts. Moreover, the cobalt catalysts promote undesirable isomerization of an alpha olefinic double bond with the result that an excess amount of branched-chain products is formed. Finally, high reaction temperatures are required for economic operation and such temperatures lead to undesirable side reactions.

Other prominent carbonylation catalyst systems are those comprising palladium halide phosphine complexes such as bis(triphenylphosphine)palladium dichloride, which are disclosed in U.S. Pat. No. 3,437,676. However, these catalyst systems are likewise undesirable because of the large proportion of branched-chain products produced. Moreover, such catalyst compositions require the addition of strong acids such as hydrochloric acid to maintain high activity and selectivity.

SUMMARY OF THE INVENTION

It has now been found that carboxylic acids and carboxylic acid derivatives are produced in high yield and with a relatively high ratio of straight-chain to branched-chain products by contacting an olefinically unsaturated compound with carbon monoxide and a hydroxylic compound in the presence of a catalyst system consisting essentially of (a) zero-valent palladium or platinum complexed with a trisorganophosphine ligand and (b) excess ligand in an amount such that there are from about 10 moles to about 150 moles of said ligand per mole of palladium or platinum complex.

The palladium and platinum complex catalyst compositions of this invention are substantially more active for hydroxycarbonylations and carboxylic acid anhydride synthesis than are known carbonylation catalysts.

DESCRIPTION OF THE PREFERRED EMBODIMENTS

In the process according to this invention the olefinically unsaturated compound to be carbonylated is contacted with carbon monoxide and a hydroxylic compound in the presence of a catalyst composition as herein described. Whenever the hydroxylic compound employed in the process is water, the predominant product is a carboxylic acid and the process is conveniently termed a "hydroxy-carbonylation." The overall reaction is represented by the following equation (I)

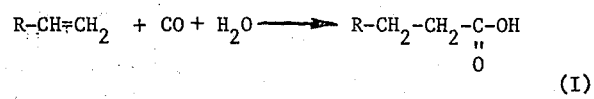

(I)

If an alcohol is employed as the hydroxylic compound, the product is an ester and the process is designated an "alkoxycarbonylation." Such a process is represented by the following equation (II)

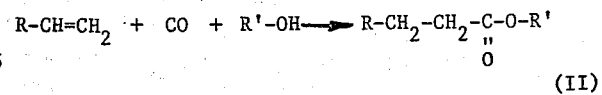

(II)

Finally, if a carboxylic acid is employed as the hydroxylic compound the product is a carboxylic acid anhydride. The overall reaction is represented by the following equation (III)

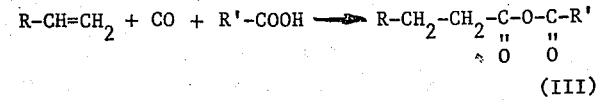

(III)

From the foregoing equation III, it is apparent that if the carboxylic acid reactant contains one carbon atom more than does the olefinic reactant, then the product will be a symmetrical acid anhydride. For example, ethylene is carbonylated with carbon monoxide in the presence of propionic acid to form propionic anhydride. However, when the olefin is carbonylated in the presence of a carboxylic acid with a carbon number which is other than one more than the olefin, there is generally obtained a mixture of acid anhydrides of differing carbon numbers. For example, ethylene is carbonylated with carbon monoxide in the presence of acetic acid to form a mixture containing acetic anhydride, propionic anhydride and a mixed anhydride of acetic and propionic acid. The mixed anhydride which is initially formed tends to rearrange upon heating to produce a mixture of symmetrical acid anhydrides of differing carbon numbers. In one modification of the instant invention an olefin is carbonylated in the presence of carbon monoxide and water to initially form a carboxylic acid which is thereafter reacted with another molecule of the olefin and carbon monoxide in a second carbonylation to thereby produce the carboxylic acid anhydride. Such a result is effected in separate carbonylation reaction zones or in one reaction zone by proper selection of the reaction conditions and proportions of reactants.

The Olefinic Reactant

The olefinically unsaturated compounds which are useful in the process of the instant invention are those of from 2 to 30 carbon atoms free from acetylenic unsaturation and conjugated olefinic unsaturation. Suitable olefins include unsubstituted olefins and substituted olefins wherein said substituents are in non-conjugated positions and are non-interfering. Illustrative substituent groups are esters of from 2 to 5 carbon atoms, cyano, halogen, alkoxy of from 1 to 4 carbon atoms and aryl. Illustrative olefins are aliphatic olefins, cycloaliphatic olefins and non-conjugated diolefins and include ethylene, propylene, butene-1, butene-2, pentene-1, cyclopentene, cyclohexene, octene-1, cyclooctene, styrene, propylcyclohexene, allylbenzene, dodecene-1, 4-chlorobenzene, p-nitroallybenzene, 1,5- hexadiene and 1,7-octadiene. Preferred olefins are straight-chain aliphatic alpha olefins and non-conjugated terminal diolefins.

The Hydroxylic Reactant

The choice of hydroxylic reactant will depend upon the desired product. Whenever the desired carbonylation product is a carboxylic acid, water is employed as the hydroxylic reactant. Whenever the carbonylation is carried out to produce a carboxylic acid anhydride, the hydroxylic reactant is preferably a carboxylic acid. Carboxylic acids which are useful in the process of the instant invention are monobasic carboxylic acids having from 2 to 20 carbon atoms and dibasic carboxylic acids having from 4 to 10 carbon atoms. Examples of suitable carboxylic acids are acetic acid, propionic acid, hexanoic acid, pivalic acid, benzoic acid, octanoic acid, succinic acid, adipic acid, suberic acid and sebacic acid. Preferred carboxylic acids are the alkanoic carboxylic acids and especially preferred are the monobasic straight chain alkanoic acids.

In employing the process of this invention to produce carboxylic acid anhydrides, it is possible, as mentioned above, to produce the carboxylic acid in situ, as for example, by carrying out a hydroxycarbonylation in the presence of excess olefin. The carboxylic acid produced as a result of the hydroxycarbonylation is carbonylated with another molecule of the olefin to produce the carboxylic acid anhydride. Of course, it is also useful, by adjusting the proportion of olefin and water or by employing a mixture of water and carboxylic acid, to produce mixtures of carboxylic acids and carboxylic acid anhydrides.

Whenever the carbonylation is carried out in the presence of an alcohol, the resulting product is an ester. Alcohols which are suitable in the instant process include aliphatic, cycloaliphatic and aromatic alcohols, and have from 1 to 20 carbon atoms. The reaction proceeds best with monohydric alcohols; however, polyhydric alcohols are also useful. Example of suitable alcohols include methanol, ethanol, propanol, stearyl alcohol, isobutyl alcohol, benzyl alcohol, cyclohexanol, butanediol-(1,4), and hexanediol-(1,6). Preferred alcohols are alkanols of from 1 to 10 carbons and alkanediols of from 2 to 10 carbons.

The Catalyst Composition

The catalyst compositions of the present invention are zero-valent palladium and platinum complexes employing a stablizing phosphine ligand, and excess ligand. Although the zero-valent complex is itself essentially inactive as a carbonylation catalyst, the presence of excess ligand in the catalyst composition produces a very active and selective catalyst. The catalyst compositions of this invention are particularly useful in the carbonylation of alpha olefins to straight-chained products in high selectivity.

The stablizing phosphine ligands which are useful in the process of this invention are trisorgano phosphines of the general formula $R_3P$ wherein R independently is an organo group having from 1 to 20 carbon atoms, preferably from 1 to 10 carbon atoms and having only aromatic unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen and halogen, particularly halogen of atomic number from 9 to 35, which atoms are present in functional groups such as alkoxy, carbalkoxy, acyl, trihalomethyl, halo, cyano, dialkylamino, sulfonylalkyl, alkanoyloxy and like groups having no active hydrogen atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and p-phenylethyl; as well as substituted groups such as 4-bromohexyl, methoxymethyl, 3-(diethylamino)propyl, 4-carbethoxybutyl and 2-acetoxyethyl. Aromatic R groups include hydrocarbyl aromatic groups such as phenyl, tolyl, xylyl, p-ethylphenyl, p-tertbutylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

In the $R_3P$ ligand as defined above, the R moieties are the same or are different, although ligands wherein all R groups are the same are generally preferred for economic reasons. However, some phosphines are more effective than others. For example the order of effectiveness of some of the phosphines evaluated is as follows: tri-p-methoxyphenylphosphine>tri-p-tolylphosphine>ethyldiphenylphosphi- >triphenylphosphine>diethylphenylphosphine>tributylphosphine.

The zero-valent noble metal-phosphine complexes of this invention are those represented by the general formula:

$$(R_3P)_nM$$

wherein M is platinum or palladium, n is a whole number from 1 to 4 inclusive and R has the previously stated significance. The zero-valent noble metal-phosphine complexes of the above formula wherein n is 4 are especially preferred. Such complexes are provided in the form of preformed complexes, which are prepared by methods known in the art, or are produced in situ in the reaction environment by contacting platinum or palladium with the phosphine ligand.

Whenever the zero-valent complex is formed in situ, the palladium or platinum is charged to the reaction medium as the metal, an oxide of the metal or a salt of the metal, e.g., halides, nitrates, cyanides and carboxylates such as acetate, propionate, valerate, etc. Whenever metallic platinum or palladium is employed, it is generally provided in a form in which there is a large surface area. For example, palladium deposited on a carbon substrate has been found an effective source of metal.

The optimum concentration of the zero-valent noble metal complex employed in the instant process will in part depend upon the nature of the carbonylation process and the particular reactants involved and can therefore vary widely. Typically from about 0.00001 to about 1.0 mole percent of noble metal complex per mole of olefinic double bond to be carbonylated is satisfactory, with amounts of from about 0.0001 to about 0.1 mole percent, on the same basis, being preferred.

The amount of phosphine ligand which must be employed in the instant process is critical. Although the optimum amount will depend upon the nature of the carbonylation process and the particular ligand employed, it is imperative that the phosphine ligand be provided such that there is free ligand present, in addition to that which is complexed with the noble metal in an amount of at least 10 moles of said ligand per mole of noble metal complex. Amounts of excess phosphine ligand of from about 10 moles to about 150 moles per mole of noble metal complex are satisfactory, with amounts of from about 20 moles to about 100 moles per mole of noble metal complex being preferred. The presence of excess ligand in such amounts favors the formation of stablization of the noble metal phosphine complexes of the above formula. If the excess ligand concentration is employed in amounts less than 10 moles per mole of noble metal complex, the catalyst compositions are significantly less active and selective in producing straight-chain carbonylation products. The activity decline is most pronounced in the case of carboxylic acid anhydride carbonylations where the operating conditions are more severe.

Generally, the excess phosphine ligand employed is the same ligand employed in preparing the noble metal complex, but it need not be. Also, mixtures of two or more of the phosphine ligands as described herein may be employed if desired.

The Reaction Conditions

The process of the invention is conducted by any of a variety of procedures. In one modification, the olefinic reactant, the hydroxylic compound, the catalyst composition and carbon monoxide are charged to an autoclave or similar pressure reactor for operations in a batchwise manner. In another modification, reaction is effected in a continuous operation as by contacting the entire reaction mixture during passage through a tubular reactor. It is equivalently useful to add the carbon monoxide continuously throughout the period of the reaction.

In the carbonylation process of the instant invention, one mole of carbon monoxide will be consumed for each mole of olefinic double bond carbonylated. However, generally an excess of carbon monoxide is present in the reaction environment. In general, molar ratios of carbon monoxide to olefinic double bond are from about 3:1 to about 100:1. The carbon monoxide is generally of standard commercial quality and may contain inert impurities such as carbon dioxide, nitrogen, noble gases, and paraffinic hydrocarbons having from 1 to 4 carbon atoms. Such impurities should not, however, be present in great quantities since the size of the process equipment would be increased. When such impurities are present the total reactor pressure will have to be increased to maintain the desired carbon monoxide partial pressure.

For each mole of olefinic double bond carbonylated, there will also be consumed one equivalent of hydroxylic compound. Thus, in carbonylations involving water, monohydric alcohols and monobasic carboxylic acids there will be consumed 1 mole of hydroxylic compound for each mole of olefinic double bond carbonylated. However, in practice the provision of amounts ranging from 0.1 mole to 10 moles of hydroxyl group per mole of olefinic double bond is satisfactory. Although it is generally desirable to employ the hydroxylic compound in amounts greater than 1 mole of hydroxyl group per mole of olefinic double bond in order to ensure efficient reaction of the olefinic compound, there are occasions where lesser ratios are desirable. For example, whenever the carbonylation reaction is conducted with water as the hydroxylic compound and the desired product is the acid anhydride, the molar ratio of hydroxyl group to olefinic double bond will be less than 1:1. If the acid anhydride is to be the predominant product the ratio of hydroxyl group to olefinic double bond is 1:2 or less.

Due to the high activity of the catalyst compositions of the instant invention, operating conditions are relatively mild. Operating temperatures of from about 50°C to about 300°C are satisfactory with temperatures of from about 100°C to about 200°C being preferred. The optimum temperature will, of course, depend upon the olefinic reactant as well as the type of hydroxylic compound with which it is being carbonylated. Typically, the mildest conditions are required for alkoxycarbonylations and more severe conditions are required in the acid anhydride synthesis.

The carbonylations of this invention are conducted under carbon monoxide partial pressures of from about 300 psig to about 3,000 psig, with carbon monoxide partial pressures of from about 500 psig to about 2,000 psig being preferred.

Although a solvent is not required in order to carry out the instant carbonylation reactions, a solvent is often desirable, as for example, in hydroxycarbonylations. In such carbonylations a solvent in which the reactants and the catalyst composition are soluble generally increases the reaction rate. Various organic liquids which may be employed for this purpose include carboxylic acids such as acetic acid, propionic acid, octanoic acid, benzoic acid; alkyl and aryl sulfoxides such as dimethylsulfoxide and diphenylsulfoxide; alkyl and aryl sulfones, such as diisopropylsulfone and methylbenzylsulfone; ketones, such as acetone, methylethylketone and cyclohexanone; amides, such as formamide, dimethylformamide, acetamide, and N-phenylacetamide; ethers, such as diisopropylether, ethylbenzylether, ethyleneglycoldibutylether and diethyleneglycoldimethylether; and esters, such as methyl acetate, ethyl propionate, ethyleneglycol diacetate and dimethylphthalate. It is preferred to employ solvents which are similar to the reaction product of the carbonylation reaction, and especially preferred is the reaction product itself. Although some of these solvents are also suitable reactants at the proper reaction conditions, they are essentially inactive at the milder operating conditions present in an alkoxy carbonylation or a hydroxycarbonylation. For example, propionic acid is an excellent solvent in the hydroxycarbonylation of ethylene to propionic acid, although at more severe operating conditions propionic acid is a suitable hydroxylic reactant in a carboxycarbonylation (carboxylic anhydride synthesis). Whenever a solvent is employed, the amount used is not critical and can vary widely. Typically, amounts of solvent of from about 10% to about 500% by weight of the total reactants are satisfactory.

Subsequent to reaction, the reaction mixture is separated by conventional means, such as distillation, selective extraction and the like. The product can be further purified, as for example, by distillation. Unreacted olefinic and hydroxylic reactants as well as the catalyst composition are recovered and are recycled and further reacted by the process of this invention.

The following examples are presented to describe the invention more fully without any intention of being limited to the details thereof. All parts and percentages are by weight unless otherwise specified.

EXAMPLE I

A. Into a 600 ml Hastelloy B rocking autoclave were placed 0.184 g. tetrakis(triphenylphosphine)palladium [$\phi_3P)_4Pd(O)$], 1.35 g. triphenylphosphine and 8.0 g. water. The reactor was then pressured to 300 psig with ethylene and then to 925 psig with carbon monoxide at 25°C. The reactor temperature was then raised to 135°C and maintained at this temperature for 20 hours. After this reaction period the reactor was cooled and the pressure vented. An analysis of the liquid reaction products by gas-liquid chromatography showed a yield of 12.0 g. of propionic acid.

B. For comparative purposes the experiment was repeated except that no free triphenylphosphine was added. The reaction products showed no propionic acid formed.

EXAMPLE II

To demonstrate the efficacy of the instant catalyst systems in carbonylating olefins to predominantly straight-chain products, a series of experiments was conducted wherein various olefins were hydroxycarbonylated to the corresponding acids. In this series of experiments the catalyst system was prepared in situ from 5% palladium-on-carbon and triphenylphosphine. The procedure employed was similar to that of Example I. In each run the reactor was charged with 0.33 g of 5% palladium-on-carbon, 1.5 g. triphenylphosphine, 4.0 g. water and 8.0 g. propionic acid as solvent. Then the olefin was added in the amount listed and the reactor was pressurized to 925 psig with carbon monoxide. After the reaction time shown the reactor contents were analyzed for acid produced. The results are summarized in Table I.

TABLE I

| Olefin | Amount | Time Hr | Conversion wt. % | Acid Product g | Acid Composition |
|---|---|---|---|---|---|
| propylene | 300 psig | 12 | 45 | 16 | 75% n-butyric |
| octene-1 | 15 g. | 20 | 95 | 18 | 75% n-nonanoic |
| dodecent-1 | 20 g. | 20 | 50 | 10 | 75% straight chain |

EXAMPLE III

According to the procedure of Example I, a number of other compositions were evaluated for effectiveness in carbonylating ethylene to propionic acid. The data which are listed in the following Table II show that only the catalyst compositions containing zero-valent platinum-or palladium-phosphine complexes exhibited any activity for propionic acid production under the conditions shown.

TABLE II

| Catalyst Composition | Water g. | Solvent g. | Temperature °C | Time Hr. | Propionic Acid Product g. |
|---|---|---|---|---|---|
| 0.33 g. 5% Pd/C 1.5g. $\phi_3P$ | 4 | Propionic Acid, 10 g | 160 | 2 | 15 |
| 0.20 g. ($\phi_3P)_4Pt$ 1.5g. $\phi_3P$ | 4 | " | 160 | 16 | 8 |
| 0.33 g. 5% Rh/C 1.5g. $\phi_3P$ | 8 | Octanoic Acid, 2g | 200 | 18 | 0 |
| 0.33 g. 5% Ru/C 1.5 g. $\phi_3P$ | 8 | " | 200 | 18 | 0 |
| 0.4 g. ($\phi_3P)_2Ni(CO)_2$ 1.5 g. $\phi_3P$ | 8 | " | 200 | 18 | 0 |

EXAMPLE IV

According to the procedure of Example I, various trisorganophosphines were evaluated for effectiveness as ligands in the catalyst compositions of this invention. In the following runs the zero valent noble metal-phosphine complex was prepared in situ by charging 0.33 g of 5% palladium-on-carbon to the reactor along with the phosphine ligand. 2.0 g. of octanoic acid was employed as a solvent. The results are presented in Table III.

TABLE III

| Trisorganophosphine | Amount g. | Temp. °C | Time Hr | Propionic Acid, g |
|---|---|---|---|---|
| Triphenylphosphine | 1.5 | 135 | 14 | 30 |
| Tri(p-tolyl)phosphine | 1.6 | 135 | 9 | 30 |
| Ethyldiphenylphosphine | 1.3 | 135 | 9 | 30 |
| Diethylphenylphosphine | 1.1 | 135 | 30 | 12 |
| Tri-n-butylphosphine | 1.2 | 200 | 20 | 4 |

EXAMPLE V

To demonstrate the efficacy of the catalyst compositions of the instant invention in alkoxycarbonylating olefins in the presence of alcohols to produce esters, a series of runs was conducted wherein both preformed and in situ formed zero-valent palladium-phosphine catalyst compositions were employed. In each run the 600 ml Hastelloy B reactor was charged with 5.0 g octene-1, 10.0 g. ethanol and the palladium complex and phosphine ligand indicated in the following Table IV. The reactor was then pressured to 925 psig with carbon monoxide at 25°C and the reactions were then carried out for 16 hours at the temperatures listed.

TABLE IV

| Catalyst Composition | Temp °C | Olefin Conversion wt % | Selectivity Ethyl pelargonate wt % | Branched Ester wt % |
|---|---|---|---|---|
| $(\phi_3P)_4Pd$, 0.180 g. | 135 | 95 | 53 | 47 |
| $(\phi_3P)_4Pd$, 0.180 g. $\phi_3P$, 1.35 g. | 135 | 96 | 80 | 20 |
| $(\phi_3P)_4Pd$, 0.180 g. | 160 | 82 | 49 | 51 |
| $(\phi_3P)_4Pd$ 0.180 g. $\phi_3P$, 1.35 g. | 160 | 93 | 78 | 22 |
| $PdCl_2$ 0.028 g. $\phi_3P$, 1.50 g. | 160 | 90 | 78 | 22 |
| 5% Pd/C, 0.33 g. $\phi_3P$, 1.50 g. | 160 | 40 | 83 | 17 |
| $PdCl_2$ 0.028 g. $(m-CH_3-\phi)_3P$, 1.50 g. | 160 | 96 | 79 | 21 |

The above data demonstrate that although the zero-valent palladium complexes were individually active in alkoxycarbonylating octene-1 in the absence of added phosphine ligand, the proportion of branched ester produced approximated 50%. With excess phosphine ligand in the catalyst compositions, the activity was increased and the selectivity to straight-chain ester was significantly higher.

EXAMPLE VI

When the carbonylation reaction is carried out in the presence of a carboxylic acid, the resulting product is an acid anhydride. According to the procedure of Example I, zero-valent palladium phosphine complex [tetrakis(triphenylphosphine)-palladium], excess phosphine ligand and 10 g propionic acid were placed in the reactor. The reactor was then pressured to 300 psig with ethylene and then to 925 psig with carbon monoxide at 25°C. The reaction mixture was then heated to 135°C and maintained at this temperature for 20 hours. At the end of this period the liquid products were recovered and analyzed for propionic anhydride. For comparative purposes, one run was made without any excess phosphine ligand and one run was made in which the zero-valent palladium phosphine complex was formed in situ by reaction of the phosphine ligand with 5% palladium-on-carbon. The data obtained are presented in Table V. T,140

EXAMPLE VII

To further demonstrate the criticality of excess phosphine ligand, two runs were made following the procedure of Example VI, in which propylene was contacted with propionic acid in the presence of zero-valent palladium phosphine complex and excess ligand. In both runs the palladium phosphine complex was formed in situ from 5% palladium-on-carbon and phosphine ligand. In one run there was present excess triphenylphosphine in an amount of approximately 33 moles of excess ligand per mole of zero-valent tetrakis(triphenylphosphine)palladium(0). In the other run there was present approximately 8.7 moles of excess phosphine ligand per mole of zero-valent tetrakis(triphenylphosphine)palladium(0). The data obtained are presented in Table VI.

TABLE VI

| Catalyst Composition | Mole ratio excess ligand | Time Hr | Max Pressure psig | Products g. | Acid Anhydride wt % |
|---|---|---|---|---|---|
| 5%Pd/C, 0.33 g. $\phi_3P$, 0.5 g. | 8.7 | 20 | 1720 | 10.8 | 0 |
| 5%Pd/C, 0.33 g. $\phi_3P$, 1.5 g. | 33.3 | 20 | 1200 | 15.5 | 52* |

*A mixture of propionic and butyric anhydrides.

EXAMPLE VIII.

Several runs were made according to the procedure of Example VI except that the zero-valent palladium phosphine complex composition was prepared in situ from 0.33 g. of 5% palladium-on-carbon and 1.5 g. triphenylphosphine (excess phosphine) and various carboxylic acids were used in place of propionic acid. In each run the reaction products contained propionic anhydride and the anhydride of the carboxylic acid reactant in nearly equimolar concentrations. The results are presented in Table VII.

TABLE VII

| Carboxylic Acid g. | Temp °C | Time Hr | Max Pressure psig | Product g. | Anhydrides % |
|---|---|---|---|---|---|
| Acetic, 10g | 135 | 20 | 1825 | 20.0 | 90 |
| Octanoic, 10g | 135 | 20 | 1945 | 16.4 | 90 |
| Pivalic, 10g | 135 | 20 | 1890 | 16.7 | 91 |
| Benzoic, 10g | 135 | 20 | 1853 | 16.0 | 90 |
| Succinic, 10g | 160 | 16 | 2010 | 27.5 | 95 |

EXAMPLE IX

Following the procedure of Example II, the carbonylation was carried out with only half as much water (4.0 g) to demonstrate the efficacy of the instant catalyst compositions in preparing carboxylic acid anhydrides in a one-step process employing as reactants only olefin, carbon monoxide and water. The data which are listed in Table VIII demonstrate that propionic anhydride is obtained in good yield and selectivity.

TABLE VIII

| Catalyst Composition | H₂O g. | Temp °C | Time Hr | Max Pressure psig | Product g. | Propionic Anhydride wt % |
|---|---|---|---|---|---|---|
| (φ₃P)₄Pd, 0.184 g. φ₃P, 1.35 g. | 4.0 | 135 | 20 | 1905 | 25.1 | 64 |
| (φ₃P)₄Pd, 0.184 g. φ₃P, 1.35 g. | 4.0 | 160 | 16 | 2045 | 31.5 | 90 |

EXAMPLE IX

Following the procedure of Example I, ethylene was carbonylated in the presence a propionic acid and zerovalent platinum phosphine complex catalyst composition containing excess phosphine ligand. The results are listed in Table IX.

TABLE IX

| Catalyst Composition | Propionic Acid g. | Temp °C | Time Hr | Max Pressure psig | Product g. | Propionic Anhydride wt % |
|---|---|---|---|---|---|---|
| (φ₃P)₄Pt, 0.20 g. φ₃P, 1.35 g. | 10 | 160 | 18 | 2000 | 12.0 | 8 |
| (φ₃P)₄Pt, 0.20 g. φ₃P, 1.35 g. | 10 | 200 | 18 | 2223 | 15.3 | 65 |

I claim as my invention:

1. In the process of carbonylating olefinically unsaturated hydrocarbons of from 2 to 30 carbon atoms free from acetylenic unsaturation and conjugated olefinic unsaturation with carbon monoxide and with at least one hydroxylic compound selected from the group consisting of water, alkanol of from 1 to 20 carbon atoms, carboxylic acid of from 2–20 carbon atoms and mixtures thereof in the presence of a catalyst, the improvement which comprises producing predominately straight chain products by employing as said catalyst a composition consisting essentially of a. a zerovalent noble metal phosphine complex of the general formula $$(R_3P)_nM$$

wherein M is palladium or platinum, n is a whole number from 1 to 4 inclusive and R independently is a monovalent hydrocarbyl or substituted hydrocarbyl moiety of from 1 to 20 carbon atoms inclusive of substituents, is free from aliphatic carbon-carbon unsaturation and is selected from the group consisting of unsubstituted alkyl, unsubstituted phenyl, monosubstituted alkyl and monosubstituted phenyl wherein said substitutent is selected from the group consisting of alkoxy, carbalkoxy, trihalomethyl, halo, dialkylamino, alkanoyloxy and phenyl, in an amount of from about 0.0001 to about 0.1 mole percent of noble metal phosphine complex per mole of olefinic double bond present, and b. from about 10 moles to about 150 moles of $R_3P$ per mole of said noble metal-phosphine complex.

2. The process of claim 1 wherein the olefinically unsaturated compound is selected from the group consisting of aliphatic alpha monoolefins and aliphatic terminal diolefins.

3. The process of claim 2 wherein the hydroxylic compound is water.

4. The process of claim 2 wherein the hydroxylic compound is alkanol of from 1 to 10 carbon atoms.

5. The process of claim 2 wherein the hydroxylic compound is a terminal alkanediol of from 2 to 10 carbon atoms.

6. The process of claim 2 wherein the hydroxylic compound is a monobasic aliphatic carboxylic acid of from 2 to 20 carbon atoms.

7. The process of claim 2 wherein the hydroxylic compound is a dibasic aliphatic carboxylic acid of from 4 to 10 carbon atoms.

8. The process of claim 2 wherein the hydroxylic compound is a mixture of water and monobasic aliphatic carboxylic acid of from 2 to 20 carbon atoms.

* * * * *